(12) United States Patent
Burkart et al.

(10) Patent No.: US 7,664,006 B2
(45) Date of Patent: Feb. 16, 2010

(54) DEVICE FOR READING FROM OR WRITING TO OPTICAL RECORDING MEDIA

(75) Inventors: Harald Burkart, Villingen-Schwenningen (DE); Günter Tabor, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 719 days.

(21) Appl. No.: 11/107,016

(22) Filed: Apr. 15, 2005

(65) Prior Publication Data

US 2005/0232123 A1   Oct. 20, 2005

(30) Foreign Application Priority Data

Apr. 15, 2004   (EP)   .................................. 04008967

(51) Int. Cl.
*G11B 7/00*   (2006.01)
(52) U.S. Cl. .................................... 369/121; 369/44.12
(58) Field of Classification Search ................. 369/121; 74/567, 569; 403/13, 14, 374.1–374.5; 359/27
See application file for complete search history.

(56) References Cited

U.S. PATENT DOCUMENTS

| 4,574,371 A | * | 3/1986 | Takemura et al. | ............ 369/121 |
| 5,521,897 A | * | 5/1996 | Nishikawa | ................... 369/116 |
| 6,585,446 B2 | * | 7/2003 | Kaneko | ....................... 74/567 |
| 2003/0053394 A1 | * | 3/2003 | Park et al. | .............. 369/112.05 |

FOREIGN PATENT DOCUMENTS

EP   1193698 A2 * 4/2002
JP   2003016659 A * 1/2003

OTHER PUBLICATIONS

Machine Assisted Translation of JP 2003-016659 A, with English abstract.*

* cited by examiner

*Primary Examiner*—Andrea L Wellington
*Assistant Examiner*—Nathan Danielsen
(74) *Attorney, Agent, or Firm*—Robert D. Shedd; Harvey D. Fried; Patricia Verlangieri

(57) ABSTRACT

A device for reading from or writing to optical recording media having an optical assembly and a laser diode coupled thereto is described. The laser diode is a twin laser diode which is coupled to the optical assembly by means of a translationally displaceable rotary joint.

4 Claims, 1 Drawing Sheet

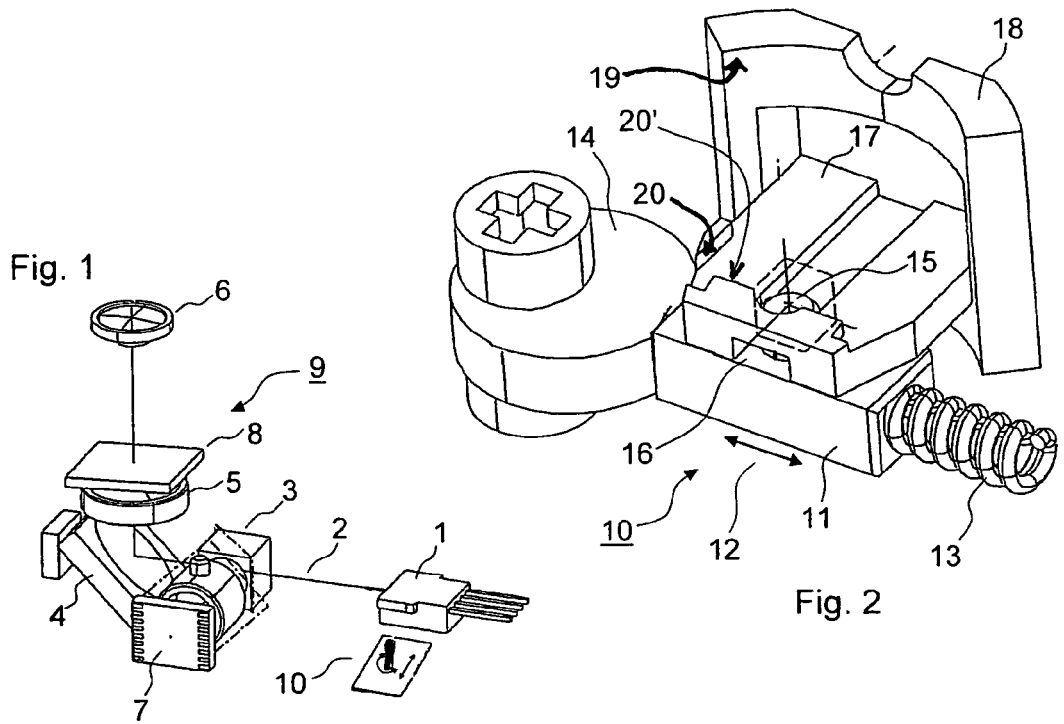
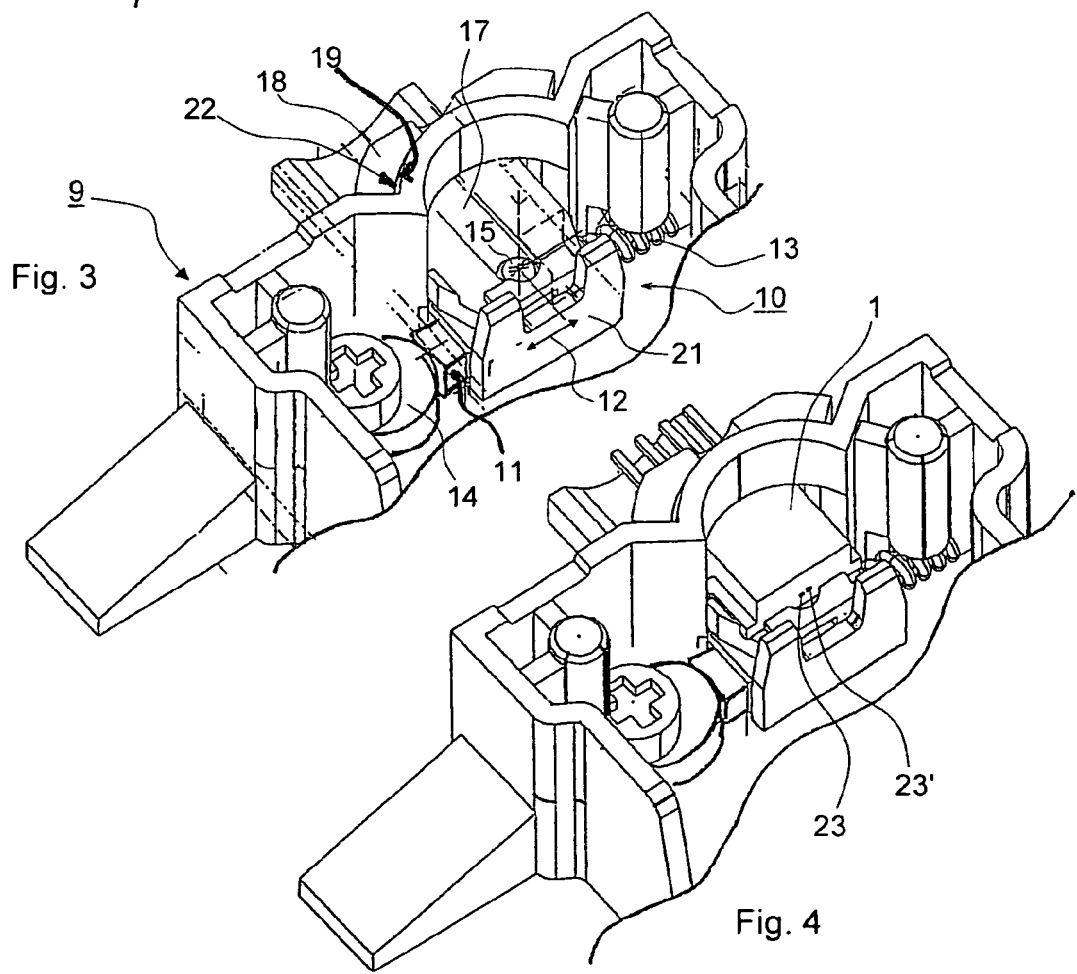

DEVICE FOR READING FROM OR WRITING TO OPTICAL RECORDING MEDIA

FIELD OF THE INVENTION

The present invention relates to a device for reading from or writing to optical recording media having an optical assembly and a laser diode coupled thereto.

BACKGROUND OF THE INVENTION

It is a current desire in industry to further develop devices of such type.

SUMMARY OF THE INVENTION

It is provided according to the invention that the laser diode is a twin laser diode which is coupled to the optical assembly by means of a translationally displaceable rotary joint. This has the advantage that it is possible for the twin laser diode to be adjusted easily relative to the ideal beam path of the optical assembly, since both translation and rotation are possible. These are the two essential degrees of freedom in terms of which a twin laser diode is to be adjusted. Depending on the nature and requirement of the optical assembly, the adjustment is performed in a fashion optimized for one of the two beams of the twin laser diode. A compromise solution virtually adapted to both beams is also advantageously possible here. A twin laser diode is regarded as a laser diode or a general light source which is capable of emitting light of different wavelengths, each wavelength respectively being assigned different emission points spaced apart from one another. Twin laser diodes generate two wavelengths, but a larger number of different wavelengths is also within the scope of the invention. The known optical recording media of CD, DVD, or else other optical recording media, come into consideration as optical recording media. The optical assembly has the purpose of optical scanning of the optical recording medium, and detecting the information obtained from the optical recording medium. The laser diode serves for generating a light beam for scanning the optical recording medium by means of the optical assembly. It is coupled to the latter in order to feed a light beam generated by it into the optical assembly with the correctly adjusted orientation.

It is provided according to the invention that the translationally displaceable rotary element is a slide which is prestressed by a spring and can be displaced counter to the prestressing by means of a setting element, and is connected in rotary fashion to a holder for the laser diode. This has the advantage that only the slide need be displaced, and not the holder for the laser diode, while only a rotary setting is to be undertaken with the holder. Separate setting of these functions simplifies the setting and reduces possible erroneous settings. It is possible to dispense with special setting apparatuses, and this is particularly advantageous whenever only a small installation space is available which impedes the action of an external setting apparatus or renders it impossible. The holder for the laser diodes has generally relatively large dimensions, in order to offer a secure support for the laser diode and to dissipate corresponding waste heat effectively. The spring is advantageously a pressure spring which acts on one end of the slide, while the setting element is a pressure element which acts on the opposite end of the slide. However, it is also advantageously possible to have a single-ended arrangement of spring and setting element. In this case, tension spring and pressure element, or pressure spring and action element are combined.

The setting element is advantageously an eccentric. This has the advantage that it is possible thereby with particular ease to undertake translational settings. The eccentric is advantageously arranged at the opposite end of a pressure spring.

It is provided according to the invention that the mutually adjusted elements of laser diode, rotary joint and optical assembly are bonded together. This is a particularly simple and reliable measure for fixing the relative position of these elements after successful adjustment, and for preventing any displacements of the elements relative to one another that are possible owing to ageing or temperature.

Advantageous refinements of the invention are likewise to be gathered from the following description of an exemplary embodiment. It is self-evident that the invention is not limited to the combinations specified.

BRIEF DESCRIPTION OF THE DRAWINGS

FIG. 1 shows a device according to the invention in a schematic illustration,

FIG. 2 shows a rotary joint of a device according to the invention,

FIG. 3 shows a part of a device according to the invention, and

FIG. 4 shows a part of a device according to the invention with a laser diode.

DETAILED DESCRIPTION OF PREFERRED EMBODIMENTS

FIG. 1 shows a schematic illustration of the beam path in a device according to the invention. A laser diode, here a twin laser diode 1, generates a linearly polarized scanning beam 2 which passes a beam splitter 3, is deflected by a mirror 4, passes a collimator 5 and a λ/4 plate 8, and is focused by an objective lens 6 onto an optical recording medium (not illustrated here). From there, the scanning beam 2 is reflected and cast onto a detector element 7 by the polarizing beam splitter 3. The twin laser diode 1 is capable of outputting scanning beams of different wavelength which are suitable for scanning different optical recording media such as CD and DVD. In this case, the emission points of the two scanning beams are displaced slightly from one another. The displacement is in this case of the order of magnitude of 100 μm, the figure being 110 μm in the exemplary embodiment. Provided for the purpose of adjusting the laser diode 1 with reference to the beam path of the optical assembly 9 consisting of the elements 3 to 8 is a displaceable rotary joint 10. This is illustrated diagrammatically here, arrows indicate the translational and rotary mobility.

FIG. 2 shows details of the rotary joint 10 of a device according to the invention. A slide 11 is visible which is translationally displaceable in the direction of the double arrow 12. At the right-hand end in the figure, the slide 11 is prestressed to the left by means of a pressure spring 13. At the right-hand end in the figure, the slide 11 is supported by means of an eccentric 14. Rotating the eccentric 14 causes the slide 11 to be displaced, in cooperation with the pressure spring 13, to the left and right, respectively, in the direction of the arrow 12. The eccentric 14 serves in this case as setting element. The slide 11 is provided on its top side with a pin 15 which is arranged in a cutout 16 of a holder 17. The holder 17 and slide 11 are therefore connected to one another such that they can rotate about the axis of the pin 15. The holder 17 is connected to a stop element 18, advantageously being designed in one piece therewith, which stop element has a curved surface 19 whose cylinder axis coincides approximately with that of the pin 15. The holder 17 is provided with stop surfaces 20, 20' on which the laser diode 1 (that is not illustrated here) comes to bear and is thus aligned.

FIG. 3 shows a part of a device according to the invention in which the rotary joint 10 is arranged. The holder 17, the slide 11 projecting below it, the eccentric 14 and the pressure spring 13 are to be seen. Also to be seen is that the holder 17 bears against a front stop 21 along which the translational movement caused by the eccentric 14 and pressure spring 13 takes place in the direction of the arrow 12. During the rotary movement about the axis of the pin 15, the curved surface 19 of the stop element 18 slides along an oppositely curved surface 22 of the optical assembly 9. After both the translational and the rotary adjustment have been undertaken in an adjusting operation, the respective elements are connected to one another by means of an adhesive. This is performed, for example, by inserting the adhesive between the surfaces 19 and 22 as well as on the eccentric 14, slide 11, stop 21, holder 17 and spring 13.

FIG. 4 shows the same part of a device according to the invention as FIG. 3, but here with a laser diode 1. Indicated diagrammatically here are the different emission points 23, 23' for the different laser beams generated by the twin laser diode 1. All other elements correspond to those described in relation to FIG. 3.

In the case of twin laser diodes 1, the emission point of the diode for CD beam or DVD beam, which do not lie at one point, must be adjusted rotationally and also translationally in accordance with the optical design (CD or DVD priority). In order to avoid the need for the complete holder 17 of the laser diode 1 to be adjusted both rotationally and translationally, only the point of rotation of the laser holder is designed to be translationally displaceable. The rotary joint, for example fixed pin 15 and bore, of the laser holder is mounted on a slide 11. This avoids the need for the complete holder 17 of the laser 1 to be displaced in the restricted installation space of the optical scanning unit (pick-up). If the slide 11 is pressed by means of a force, for example by a spring, against a stop which can be set, for example eccentric disc, it is possible to dispense with a special setting apparatus for the translational movement. Application is expedient whenever an adjustment with the aid of a translationally displaceable rotary joint is required in a small installation space and it is impossible to use setting apparatuses because of the need for space.

What is claimed is:

1. A device for reading from or writing to optical recording media, having an optical assembly and a laser diode coupled thereto, the laser diode being a twin laser diode which is coupled to the optical assembly by means of a translationally displaceable rotary joint having an axis of rotation as well as direction of translation perpendicular to the optical axis of the twin laser diode, wherein the translationally displaceable rotary joint is a slide which is prestressed by a spring, is displaced counter to the prestressing by means of a setting element and is rotatably connected to a holder for the laser diode and the axis of rotation of the translationally displaceable rotary joint is perpendicular to the direction of translation of the translationally displaceable rotary joint.

2. The device according to claim 1 wherein the setting element is an eccentric.

3. The device according to claim 2 wherein the mutually adjusted elements of laser diode, rotary joint and optical assembly are bonded together.

4. The device according to claim 1 wherein the mutually adjusted elements of laser diode, rotary joint and optical assembly are bonded together.

* * * * *